(12) United States Patent
Hänel

(10) Patent No.: US 8,186,932 B2
(45) Date of Patent: May 29, 2012

(54) SYSTEM AND METHOD FOR STORING PRODUCTS IN A STORAGE RACK

(75) Inventor: Joachim Hänel, Bad Friedrichshall (DE)

(73) Assignee: Hanel & Co., Alstatten (CH)

( * ) Notice: Subject to any disclaimer, the term of this patent is extended or adjusted under 35 U.S.C. 154(b) by 365 days.

(21) Appl. No.: 12/595,156

(22) PCT Filed: Apr. 10, 2008

(86) PCT No.: PCT/EP2008/054371
§ 371 (c)(1),
(2), (4) Date: Oct. 8, 2009

(87) PCT Pub. No.: WO2008/125597
PCT Pub. Date: Oct. 23, 2008

(65) Prior Publication Data
US 2010/0040444 A1 Feb. 18, 2010

(30) Foreign Application Priority Data

Apr. 12, 2007 (DE) .......................... 10 2007 017 365

(51) Int. Cl.
*B65G 1/137* (2006.01)
(52) U.S. Cl. ....................................... 414/807
(58) Field of Classification Search ................. 414/267, 414/270, 280, 281, 807
See application file for complete search history.

(56) References Cited

U.S. PATENT DOCUMENTS 4,804,307 A * 2/1989 Motoda .......................... 414/282
(Continued)

FOREIGN PATENT DOCUMENTS
DE 295 12 722 U1 7/1995
(Continued)

OTHER PUBLICATIONS

International Search Report mailed Aug. 19, 2008 in corresponding International Application No. PCT/EP2008/054371 (4 pages).
(Continued)

*Primary Examiner* — Charles A Fox
(74) *Attorney, Agent, or Firm* — Brian B. Shaw, Esq.; Michael J. Didas, Esq.; Harter Secrest & Emery LLP

(57) ABSTRACT

The invention relates to a method of storing storage products in a storage rack, the storage rack comprising several rack units providing a plurality of storage spaces for the storage products. The storage rack comprises a transport shaft, a transport device being traversable on the transport shaft to transport the storage products between a service opening and a storage space. A first rack unit has the service opening and a second rack unit is spaced from the first rack unit by the transport shaft. In the method, a first storage product is transported into a buffer area spaced from the service opening of the first rack unit by the transport device for intermediate storage. A second storage product is supplied to the transport device via the service opening. The second storage product to be stored is transported into the buffer area using the transport device. Furthermore, the first storage product is to be retrieved from the buffer area and is supplied to the service opening using the transport device, and the second storage product to be stored from the buffer area is supplied to a predetermined storage space using the transport device. The invention also relates to a storage rack of this type.

10 Claims, 3 Drawing Sheets

U.S. PATENT DOCUMENTS

| | | | | |
|---|---|---|---|---|
| 5,328,316 A | * | 7/1994 | Hoffmann | 414/280 |
| 5,687,858 A | * | 11/1997 | Bouche | 211/121 |
| 6,056,134 A | * | 5/2000 | Katzenschwanz | 211/187 |
| 7,316,536 B2 | * | 1/2008 | Evans et al. | 414/270 |
| 2004/0197170 A1 | * | 10/2004 | Wurm | 414/280 |

FOREIGN PATENT DOCUMENTS

| | | |
|---|---|---|
| DE | 295 12 722 U1 | 10/1995 |
| DE | 203 17 901 U1 | 10/2003 |
| DE | 20 2005 017 269 U1 | 10/2005 |
| WO | WO 2006/010550 A | 2/2006 |
| WO | WO 2006/010550 A1 | 2/2006 |

OTHER PUBLICATIONS

PCT—Notification of Transmittal of Translation of the International Preliminary Report on Patentability (1 page); dated Nov. 19, 2009.

PCT—International Prelimary Report on Patentability (1 page); dated Oct. 11, 2009.

PCT—Translation of the Written Opinion of the International Searching Authority (5 pages).

\* cited by examiner

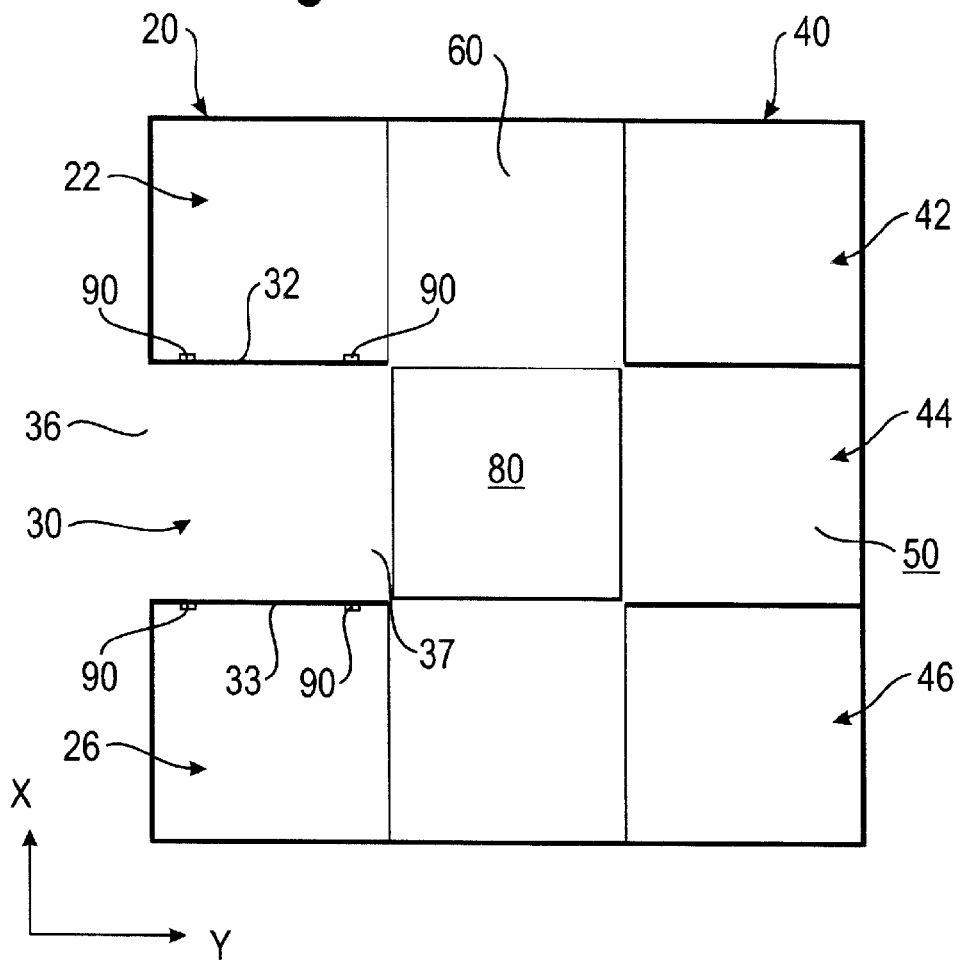
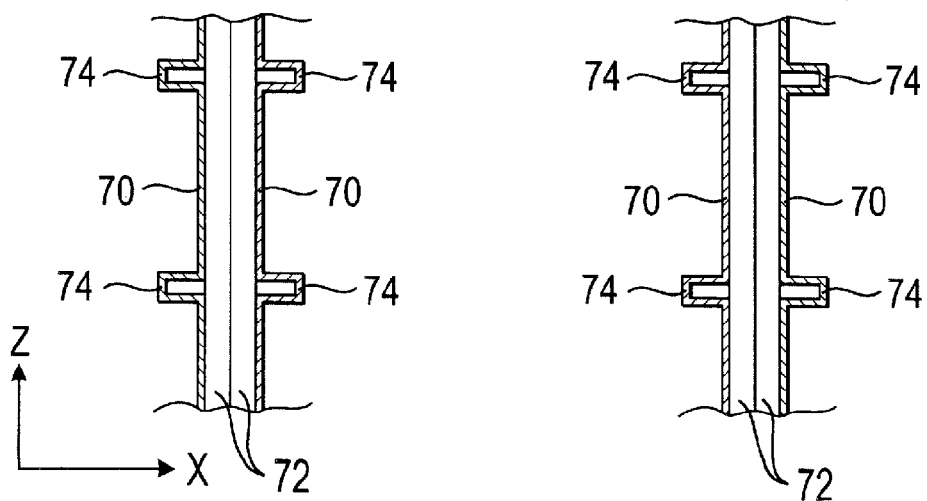

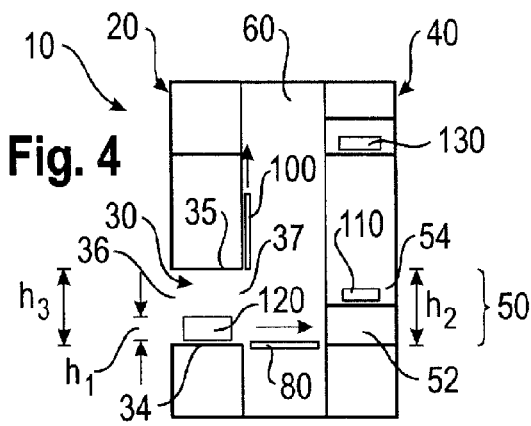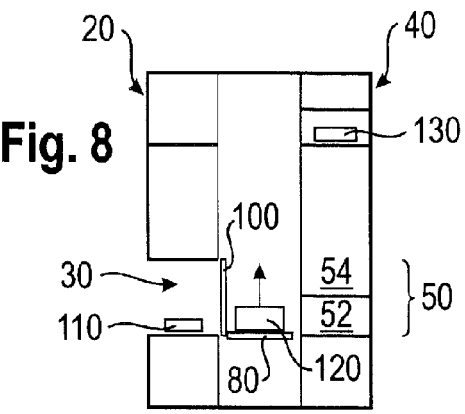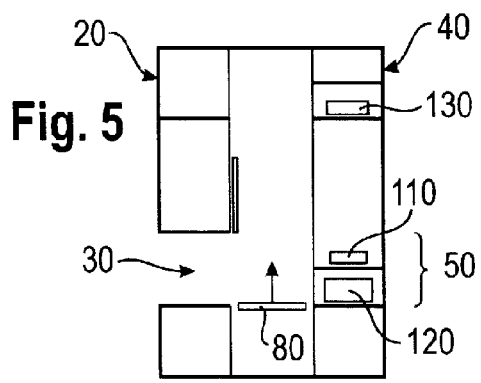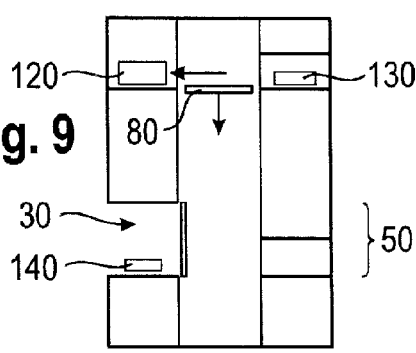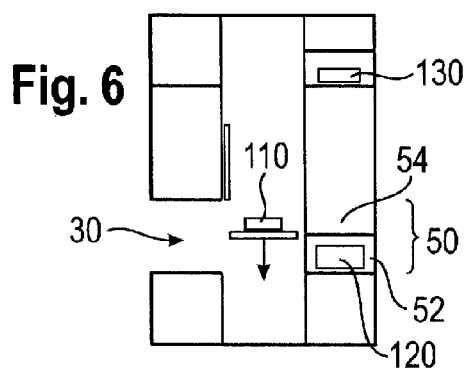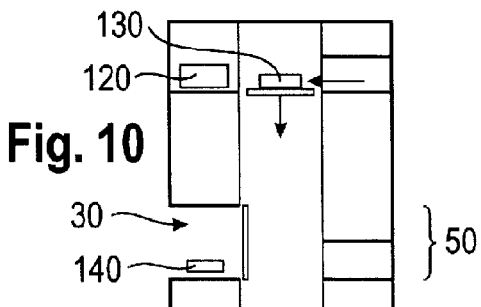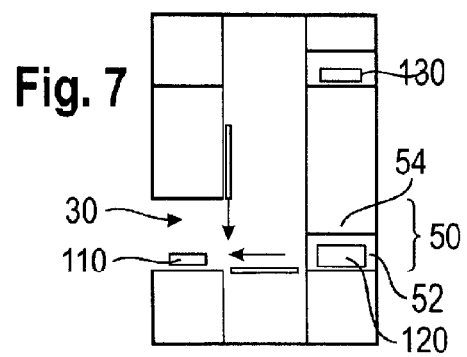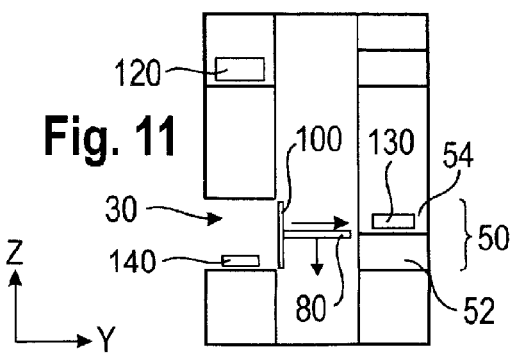

SYSTEM AND METHOD FOR STORING PRODUCTS IN A STORAGE RACK

CROSS-REFERENCE TO RELATED APPLICATIONS

This application is a national stage application and claims the priority of PCT/EP2008/054371, filed Apr. 10, 2008 which claims priority to German Application No. DE 10 2007 017 365.4-22, filed Apr. 12, 2007, herein incorporated by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present invention relates to a method of storing storage products in a storage rack with a plurality of rack units providing a plurality of storage spaces for the storage products. The storage rack comprises a transport shaft, in which a transport device is traversable to transport the storage products between a service opening and a storage location.

Storage racks are well known, which have two rows of rack units with rack modules arranged side by side, wherein, between the two rows, a transport shaft is provided in which a transport device is traversable. In one or more rack units, a service opening is provided, through which the storage products, or an storage product carrier with the storage product, can be pushed until it reaches the area of the transport shaft and can be received by the transport device. Subsequently, the storage product carrier, or the storage product, can be traversed by means of the transport device in the vertical and/or horizontal direction until the desired storage space is reached and pushed into the storage space. To reduce the number of empty traversals of the transport device, improvements on the process sequence are necessary.

2. Description of Related Art

From DE 203 17 901 U1, a storage rack is known, wherein a deposition surface receiving the storage product of the transport device is subdivided into at least two surface areas, and means for turning the transport device are provided. There is a drawback, however, in that turning the transport device is carried out within the transport shaft, and the transport shaft therefore needs a larger width than is necessary for actual transportation. Furthermore, a means requiring a lot of structural effort must be provided for turning.

BRIEF SUMMARY OF THE INVENTION

Furthermore, storage racks are well known wherein the service opening and the processes are configured in such a way that several storage product carriers to be withdrawn can be supplied to the service opening and then removed from the service opening by the operating personnel. A problem herein is that a collision can occur if the service opening is occupied in its lower range by a first storage product carrier with storage products of great height and a second storage product carrier is supplied from a storage location to the upper range of the service opening, because too little space remains in the service opening due to the excessively high storage product on the first storage product carrier. Moreover, the second storage product carrier is at an unergonomic height which makes withdrawal difficult for the personnel.

It is the object of the present invention to create a method of storing storage products in a storage rack, wherein the handling of the placement and withdrawal of the storage products is improved while reducing the amount of time needed. Furthermore, such a storage rack is to be provided.

To achieve the above object, in accordance with claim 1, a method is suggested for storing storage products in a storage rack, wherein the storage rack comprises a plurality of rack units providing a plurality of storage locations for the storage products, and a transport shaft, a transport device being traversable on the transport shaft to transport the storage products between a service opening and a storage location. Furthermore, a first rack unit includes the service opening, and a second rack unit is spaced from the first rack unit by the transport shaft. The method according to the present invention comprises the following steps:

a) transporting a first storage product to be retrieved by the transport device in a buffer area spaced from the service opening of the first rack unit for intermediate storage;

b) supplying a second storage product to be stored to the transport device via the service opening;

c) transporting the second storage product to be stored to the buffer area using the transport device;

d) supplying the first storage product to be retrieved from the buffer area to the service opening using the transport device; and e) supplying the second storage product to be stored from the buffer area to a predetermined storage space using the transport device.

Placement and withdrawal times can be reduced by the method according to the present invention. Preferably, always only one storage product, or one storage product carrier, is in the area of the service opening, meaning that there is no limitation to the height of the storage product, and all storage product carriers can be processed at an ergonomic height. As a result, collisions, for example of several storage product carriers or storage products to be withdrawn can be avoided in the area of the service opening since a second storage product carrier or a second storage product is not traversed into the storage opening. In particular, the buffer area provided in one of the rack units facilitates the removal of the storage product from the potential danger zone of the service opening and provisional positioning in the buffer area.

In the context of the present application, a rack is preferably a rack column providing a plurality of storage locations one above the other, one for each storage product carrier. Several rack columns can be positioned side by side along a longitudinal direction to form a rack row. The term storage primarily means placement and withdrawal of the storage product into or from the storage rack.

In the present application, storage product means a single storage product element or a combination of several storage product elements, or it can be replaced or complemented by a storage product carrier containing the storage product to be transported. The first storage product can thus be a first combination of storage product elements, and the fourth storage product explained below can be a second combination of storage product elements, wherein the second combination comprises more or less storage product elements in comparison with the first combination. For example, the first storage product can be referred to as the fourth storage product after removal of a requested storage product element. Alternatively, the fourth storage product can also comprise a completely new combination of storage product elements, for example, even in a different storage product carrier.

Advantageous embodiments of the method according to the present invention are presented in claims 2 to 10.

In an advantageous embodiment of the method, the buffer area is preferably associated with the second rack unit and essentially provided at the same level and/or elevation as the service opening. In other words, the buffer area is arranged in the second rack unit or rack column opposite the service opening of the first rack unit or rack column. In this way, for example, an storage product to be stored only needs to be transported from the service opening across the transport shaft into the rack unit behind it, i.e., essentially in a horizontal direction. Alternatively, the buffer area can also be associated with the first rack unit or any other rack unit.

In an advantageous embodiment, the buffer area provides at least two buffer spaces. Herein it is not necessary to provide a spatial separation of the buffer spaces, for example, by a horizontal separating wall. It is therefore sufficient if a correspondingly large space is provided for the at least two buffer spaces. For example, the storage product carriers or the storage products can be pushed onto carrier supports protruding from the side walls of the rack units.

Advantageously, the buffer area has a height corresponding to about twice the height of the maximum height provided for the storage space. This maximum height of the storage space depends on the type of storage rack, i.e., on the size and weight of the storage products, which the storage rack is supposed to handle. Basically, the buffer area can have a height corresponding to a multiple of the maximum height. In this way, it is avoided that collisions or crashes of storage product carriers or storage products occur in the buffer area. For example, in an embodiment of the present disclosure, the buffer area may have a height equal to approximately twice the predetermined maximum height of the storage space.

Furthermore, is has proven advantageous to measure the height of the storage product. A height measuring device required for this purpose is preferably provided in the area of the service opening so that storage products only pass into the buffer area after their height has been measured. Advantageously, only storage products up to a predetermined maximum height are transported into the buffer area.

In a further preferred embodiment, in a step f), a third storage product to be retrieved is supplied from its storage space to the buffer area using the transport device. Herein it is advantageous if the third storage product is in the vicinity of the storage space of the second storage product. This results in time being saved and reduces the distance to be covered by the transport device.

It is also advantageous if a fourth storage product to be stored is supplied to the transport device via the service opening in a step g). Advantageously, step g) is carried out after step f) so that the transport device only has to be operated in the area of the service opening and the buffer area for moving the storage product.

To be able to close the service opening over shorter or longer periods of time, in an advantageous embodiment, a closure element, preferably a high speed door, is opened or closed for opening or closing the service opening between two of the above mentioned steps or during at least one of these steps.

In an advantageous embodiment, the transport device comprises a first transporting means and a second transporting means, wherein the first transporting means is traversed in a vertical direction and the second transporting means is traversed in a horizontal direction. To further save transportation time, it is advantageous if the second transporting means is traversed on the first transporting means.

Furthermore, a storage rack is suggested which has the features of the preamble of claim 11, wherein a rack unit has a buffer area for intermediate storage of the storage product. Such a storage rack utilizes the advantages mentioned with reference to the above method.

Advantageous embodiments of the storage rack according to the present invention are described in claims 12 to 18.

Advantageously, the buffer area is provided in the second rack unit and essentially at the same level as the service opening. In this way, the paths to be traversed of the storage product to be stored or retrieved can be reduced and thus product ordering times can be reduced. Preferably, the buffer area comprises at least two buffering spaces. It is also advantageous if the buffer areas have a height corresponding to a multiple of the height, in particular to twice the height, of the predetermined maximum height of the storage space. In these advantageous embodiments, the advantages are the same as those mentioned above with reference to the method.

In a preferred embodiment, in the area of the service opening, a height measuring device is provided for detecting the height of the storage product. Such a height measuring device can determine the number of height units necessary for storing the storage product. Advantageously, the measuring signal of the height measuring device is fed to a control unit which traverses and supplies the storage product and/or the storage product carrier by means of the transport device to a suitable storage space as a function of the height of the storage product and the state of occupation of the storage rack. The height measuring device can be arranged in the area of the outer end of the service opening, i.e., in the area of the exterior of the first rack unit, or in the area of the inner end of the service opening, i.e., approximately adjacent to the transport shaft.

To be able to temporarily or permanently close the service opening, a closure element, preferably a high speed door, can be provided for opening and closing the service opening. Preferably, the closure element is provided at the inner end of the service opening, or on the inside of the first rack unit.

In a further preferred embodiment, the transport device comprises a first transporting means and a second transporting means, wherein the first transporting means is traversable in a vertical direction and the second transporting means is traversable in a horizontal direction. In this way, transportation can be carried out simultaneously in the vertical direction and in the horizontal direction. Advantageously, the second transporting means is supported on the first transporting means. For this purpose, guiding means, such as rails and/or wheels can be provided.

Finally, it is advantageous if the rack units have carrier supports one above the other and spaced from each other, arranged in pairs at opposite side walls of the rack units to form a storage space for the storage products and/or the storage product carriers. Such a configuration of the rack unit also in the buffer area facilitates, for example, the formation of two or more buffer spaces without having to provide a spatial separation of the buffer spaces.

BRIEF DESCRIPTION OF THE SEVERAL VIEWS OF THE DRAWINGS

The invention will be further described in the following with reference to the accompanying drawings, in which:

FIG. 2 is a horizontal sectional view of the storage rack according to FIG. 1;

FIG. 3 is a sectional view along line III-III of FIG. 1 of the side walls of two adjacent rack modules of the storage rack; and FIGS. 4 to 11 are diagrams of the method steps of the method according to the present invention of storing storage products in the storage rack according to FIGS. 1 to 3.

DETAILED DESCRIPTION OF THE INVENTION

Figure 1:
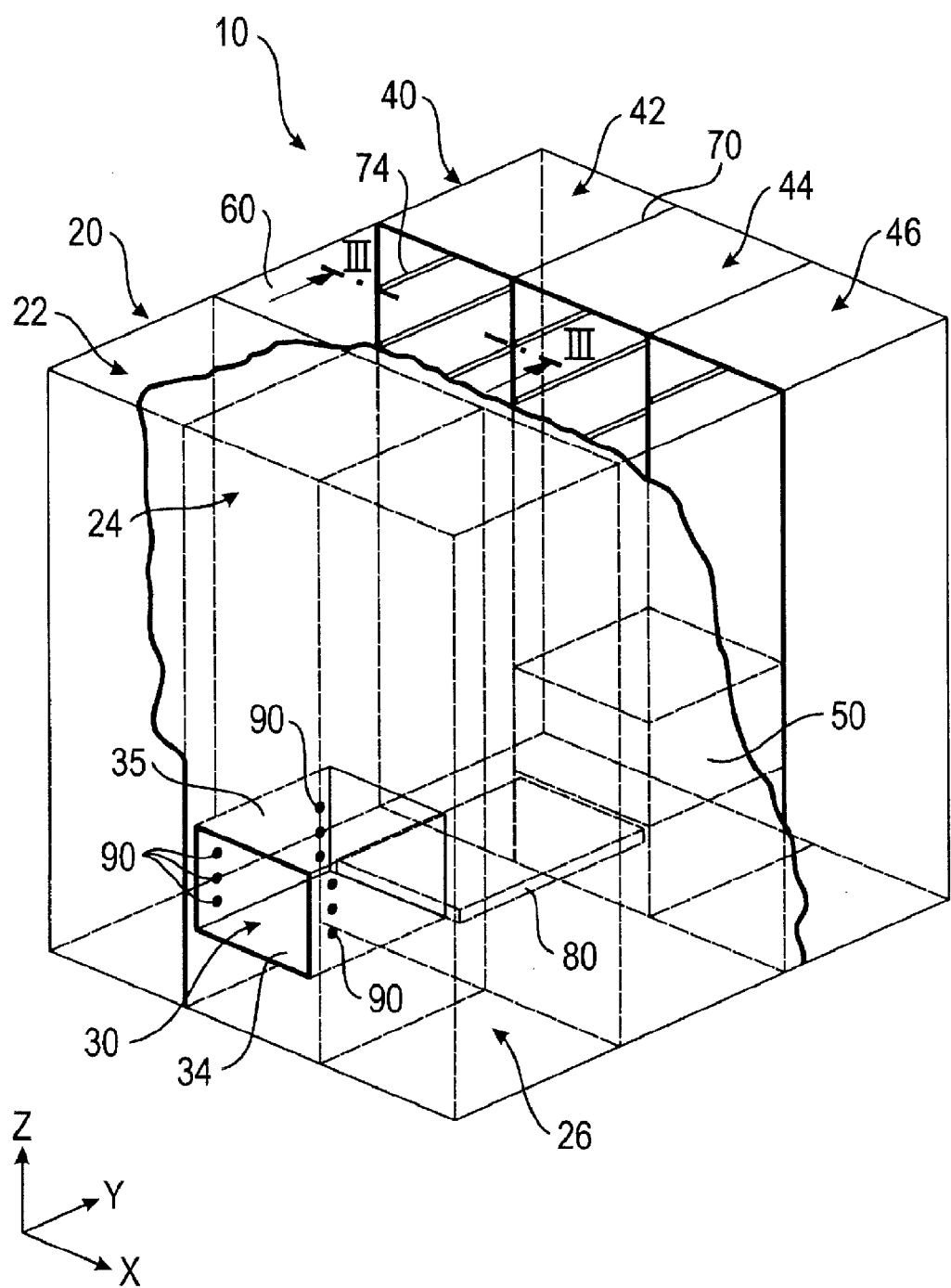
FIG. 1 is a perspective view of the storage rack according to the present invention.

FIG. 1 schematically shows the structure of a storage rack 10 according to the present invention having two rows of three rack modules arranged side by side. The rack modules 22, 24, 26 form a first rack unit 20. Rack modules 42, 44, 46 form a second rack unit 40. Each of the rack modules 22 to 26 and 42 and 46 provides a plurality of storage spaces arranged one above the other to receive storage products. In an alternative embodiment, first rack unit 20 can comprise only rack module 24 and second rack unit 40 can comprise only rack module 44.

Between the two rack units 20 and 40, a transport shaft 60 is provided with a transport device 80 which is traversable in a first horizontal direction X, a second horizontal direction Y and a vertical direction Z. Preferably, the storage product to be stored or retrieved is transported and stored by means of storage product carriers or containers.

To store the storage product or the storage product carrier in the individual storage spaces, rack modules 22 to 26 and 42 to 46 have side walls 70 with carrier supports 74 opposing each other in pairs (cf. in particular FIG. 3). Each side wall 70 of steel sheeting is welded to a column 72.

As can be seen in FIG. 3, in particular, carrier supports 74 are integrated on each side wall 70 and pressed into it in a meandering fashion. By these means, a comparatively stiff configuration of side walls 70 is ensured. To facilitate easy insertion of the storage product carriers into the storage spaces, the carrier supports 74 have a tapering cross-section on the side facing the transport shaft 60.

Furthermore, a service opening 30 in rack module 24 can be seen in FIGS. 1, 2 and 4 to 11 to be able to place storage product into storage rack 10, or to withdraw the storage product from storage rack 10. Placement and/or withdrawal of the storage product in the area of service opening 30 can be carried out manually by the operating personnel or in a fully automated fashion. As the case may be, a handing-over unit can be provided in the outside area in front of service opening 30, which takes over the storage product to be stored from a conveyor or supplies the storage product to be retrieved to a conveyor.

Service opening 30 forms a free space within fist rack unit 20 limited by two side walls 32, 33, a deposition surface 34 and a ceiling surface 35. Deposition surface 34 is for depositing storage products or storage product carriers in service opening 30. Service opening 30 has an outer end 36 facing toward the outside of storage rack 10 as seen in the horizontal direction Y, and an inner end 37 facing toward transport shaft 60. Service opening 30 makes it possible to supply a storage product to be stored to transport device 80 through first rack unit 20. Subsequently, transport device 80 can supply the storage product to be stored to the desired storage space in one of rack modules 22 to 26 and 42 to 46. In the same way, transport device 80 can pick up an storage product to be retrieved, which is stored in a storage space, and supply it to service opening 30 via transport shaft 60.

To facilitate transportation of the storage product in the first horizontal direction X, the second horizontal direction Y and the vertical direction Z, transport device 80 can have a first transporting means and a second transporting means (not shown). Herein it is advantageous if the first transporting means is traversable in the vertical direction Z and the second transporting means is supported on the first transporting means and traversable in the first horizontal direction X. Furthermore, the second transporting means can be adapted to move the storage product in the second horizontal direction Y, i.e., in particular to be able to remove the storage product from a storage space and/or to supply it to the service opening 30. This task can also be carried out by a further transporting means, for example, supported on the second transporting means. This constellation with several transporting means forming the transport device 80 facilitates transporting the storage product within transport shaft 60 in several directions simultaneously.

As can be seen, in particular, from the horizontal sectional view on the level of the operating unit according to FIG. 2, a buffer area 50 is provided in second rack unit 40 in rack module 44. Buffer area 50 is arranged essentially at the same level with respect to the vertical direction Z as service opening 30. Buffer area 50 has a height $h_2$ corresponding to twice the height of the maximum height of a storage space of storage rack 10. In the present case, buffer area 50 provides two buffer spaces 52, 54, wherein buffer space 52 is at the bottom in buffer area 50 and buffer space 54 is at the top in buffer area 50.

To close service opening 30, a closure element 100 in the form of a high speed door can be provided on the inside of first rack unit 20, i.e., in the area of inner end 37, to be able to open and close service opening 30. Furthermore, in the area of service opening 30 a height measuring device 90 used to detect the height of the storage product is provided. For this purpose, height measuring device 90 comprises a plurality of light barriers arranged one above the other both in the area of inner end 37 and in the area of outer end 36 to be able to determine the height of the storage product to be stored or to be retrieved. To achieve optimum utilization of storage capacity, the above mentioned control unit determines one or more suitable storage spaces and drives transport device 80 in such a way that the storage product is transported to the storage space determined by the control unit.

In the following, a method will be described for storing storage products, i.e., for placing and/or withdrawing storage products into and out of storage rack 10, respectively, with reference to the successive method steps schematically shown in FIGS. 4 to 11.

In a first method step, a first storage product 110 to be retrieved is transported by transport device 80 from its storage space to buffer area 50 of second rack unit 40. FIG. 4 already shows the situation after completion of this method step, in which first storage product 110 is in the area of top buffer space 54 of buffer area 50. To illustrate the transport paths, arrows are shown in FIGS. 4 to 11.

Next, transport device 80 takes a second storage product 120 to be stored out of service opening 30. This process can occur prior to, during or after the above-mentioned first method step. After the second storage product 120 has been picked up by transport device 80 and is within transport shaft 60, it is transported by transport device 80 into buffer area 50 and supplied to the bottom buffer space 52 (cf. FIGS. 4 and 5).

Subsequently, transport device 80 is traversed from the position shown in FIG. 5 at the level of the bottom buffer space 52 to the position shown in FIG. 6 at the level of the top buffer space 54. Now, as can be seen from a combination of FIGS. 6 and 7, the transport device 80 picks up the first storage product 110 and transports it into the area of service opening 30.

Then transport device 80 can pick up second storage product 120 from buffer space 52 and supply it to a suitable storage space (cf. FIGS. 7 and 8). As shown in FIG. 9, in the present case, the suitable storage space is in the upper range of rack module 24 of first rack unit 20, approximately on the opposite side of a third storage product 130 stored in rack module 44 of second rack unit 40. In other words, the storage space for the second storage product 120 is on the one hand suited for the height of storage product 120 to be stored, and on the other hands it is also suited for the third storage product 130 to be subsequently retrieved.

In a subsequent step it is thus possible to withdraw third storage product 130 from its storage space by means of transport device 80 (cf. FIG. 10) and to supply it to buffer space 54 of buffer area 50 (cf. FIG. 11).

Meanwhile, the requested storage product element can be removed from the combination of storage product elements of storage product 110. The storage product 110 now comprising one storage product element less, is now referred to as a fourth storage product 140. Alternatively, fourth storage product 140 can also comprise a completely different combination of storage product elements and a different storage product carrier.

Now, to store the fourth storage product 140, similarly as in the above-mentioned second storage product 120 to be stored, it is supplied to the service opening 30 or is still present there (cf., for example, FIG. 9). In other words, the situation shown in FIG. 11 with third storage product 130 to be retrieved in the area of upper buffer space 54 and with fourth storage product 140 to be stored in the area of service opening 30, corresponds to the situation shown in FIG. 4. Herein, in a comparison of FIG. 4 with FIG. 11, second storage product 120 corresponds to fourth storage product 140 and first storage product 110 corresponds to third storage product 130. Thus, with the situation shown in FIG. 11, a new process cycle begins and is carried out in the same way according to FIGS. 4 to 11.

In FIG. 4, a plurality of height dimensions can be seen, which also apply to FIGS. 5 to 11, wherein height $h_1$ is a height of storage products 110 to 140. In accordance with this height $h_1$ measured by height measuring device 90, the control unit determines a suitable storage space of sufficient height. A height $h_3$ of the service opening is essentially the maximum height determined for the storage product to be stored in the present type of storage rack. As already mentioned above, buffer area 50 has a height $h_2$, which corresponds approximately to twice the height of the predetermined maximum height of the storage space. In other words, buffer area 50 has a height $h_2$ sufficient to provide two buffer spaces 52, 54. Each buffer space 52, 54 could thus accommodate an storage product with maximum height. If needed, height $h_2$ can be a multiple of the maximum height of the storage product.

Furthermore, as indicated by the closed and opened positions in FIGS. 4 to 11, a closure element 100 can be provided. Preferably, closure element 100 is opened or closed between two steps or during at least one of the method steps. Opening and closing can also be controlled by the control unit.

The method described is distinguished in particular in that the placement and withdrawal processes are adapted to each other in a time-saving manner, wherein collisions between an storage product 120 or 130 to be stored and an storage product 110 or 140 to be retrieved are avoided. Also, a situation where more than one storage product or more than one storage product carrier is positioned in the area of service opening 30 never occurs. In this way, a maximum of one storage product is present at any one time in the area of service opening 30 so that the height position of service opening 30 can be optimized from the ergonomic point of view. Furthermore, the height required for the service opening 30 can be reduced to the maximum height of the storage product to be stored for each type of storage rack, whereby only a height measuring device is necessary which is correspondingly dimensioned. By traversing storage products into buffer area 50 only after their height has been measured, a crash is also avoided in buffer area 50. Furthermore, both the duration of the process cycle of an storage product exchange and the storing time for a new storage product to be stored can be reduced.

| List of Reference Numerals | |
|---|---|
| 10 | storage rack |
| 12 | first rack unit |
| 22 | rack module |
| 24 | rack module |
| 26 | rack module |
| 30 | service opening |
| 32 | side wall |
| 33 | side wall |
| 34 | deposition surface |
| 35 | ceiling surface |
| 36 | outer end |
| 37 | inner end |
| 40 | second rack unit |
| 42 | rack module |
| 44 | rack module |
| 46 | rack module |
| 50 | buffer area |
| 52 | buffer space |
| 54 | buffer space |
| 60 | transport shaft |
| 70 | side wall |
| 72 | column |
| 74 | carrier supports |
| 80 | transport device |
| 90 | height measuring device |
| 100 | closure element |
| 110 | first storage product |
| 120 | second storage product |
| 130 | third storage product |
| 140 | fourth storage product |
| $h_1$ | height of storage product |
| $h_2$ | height of buffer area |
| $h_3$ | height of service opening |
| X | first horizontal direction |
| Y | second horizontal direction |
| Z | vertical direction |

The invention claimed is:

1. A method of storing storage products in a storage rack, the storage rack comprising
   (a) a plurality of rack units providing a plurality of storage spaces for the storage products, and
   (b) a transport shaft, a transport device being traversable on the transport shaft to transport the storage products between a service opening and a storage space,
   wherein a first rack unit includes the service opening and a second rack unit is spaced from the first rack unit by the transport shaft, the method comprising the following steps:
   (i) transporting a first storage product to be retrieved by the transport device into a buffer area spaced from the service opening of the first rack unit for intermediate storage;
   (ii) supplying a second storage product to be stored to the transport device via the service opening;
   (iii) transporting the second storage product to be stored to the buffer area using the transport device;

(iv) supplying the first storage product to be retrieved from the buffer area to the service opening using the transport device; and (v) supplying the second storage product to be stored from the buffer area to a predetermined storage space using the transport device.

2. The method according to claim 1, wherein the buffer area is associated with the second rack unit and is disposed at substantially the same elevation as the service opening.

3. The method according to claim 1, wherein the buffer area provides at least two buffer spaces.

4. The method according to claim 1, wherein the buffer area has a height equal to approximately twice the predetermined maximum height of the storage space.

5. The method according to claim 1, further including measuring a height of at least one of the storage products.

6. The method according to claim 1, further including transporting storage products having a predetermined maximum height into the buffer area.

7. The method according to claim 1, further including supplying a third storage product to be retrieved to the buffer area using the transport device.

8. The method according to claim 7, further including supplying, a fourth storage product to be stored to the transport device via the service opening.

9. The method according to claim 1, further including at least one of opening and closing the service opening with a closure element, wherein the closure element is opened or closed either between two of steps (i) through (v) or during at least one of steps (i) through (v).

10. The method according to claim 1, wherein the transport device comprises a first transporting means and a second transporting means, wherein the first transporting means is traversed in a vertical direction and the second transporting means is traversed in a horizontal direction.

* * * * *